March 8, 1966  W. C. ALBERT  3,239,620
VELOCITY SWITCH
Filed Nov. 9, 1964
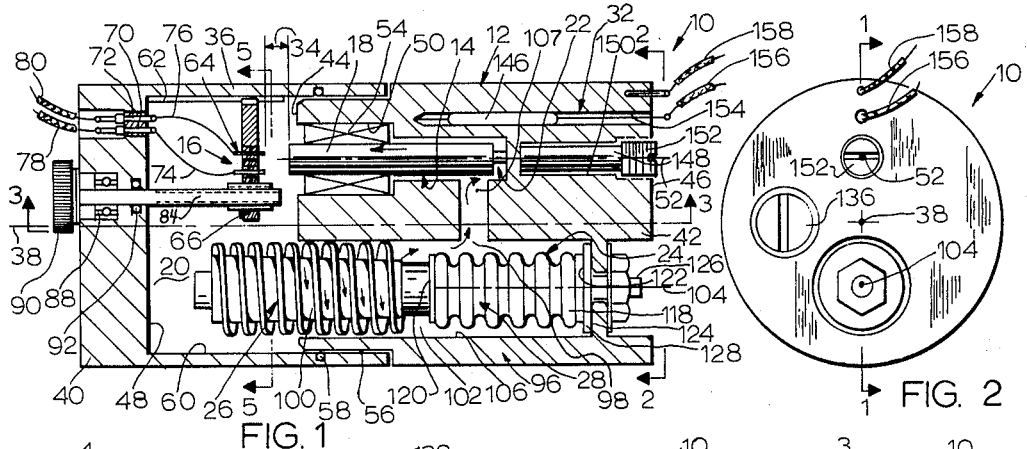
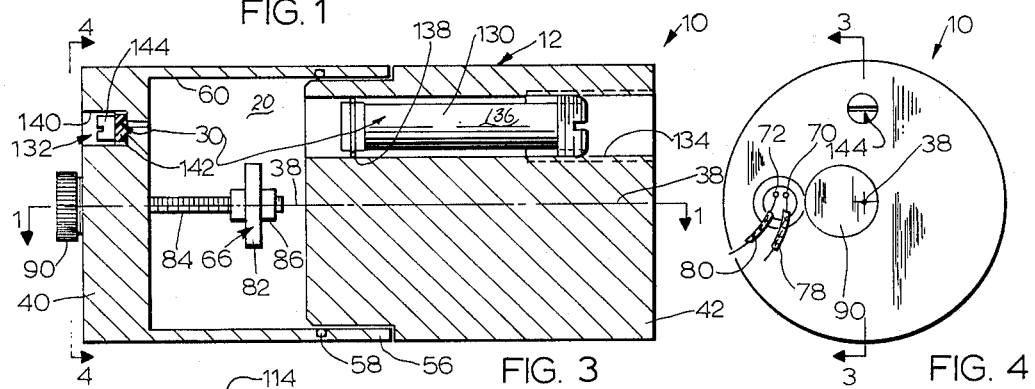
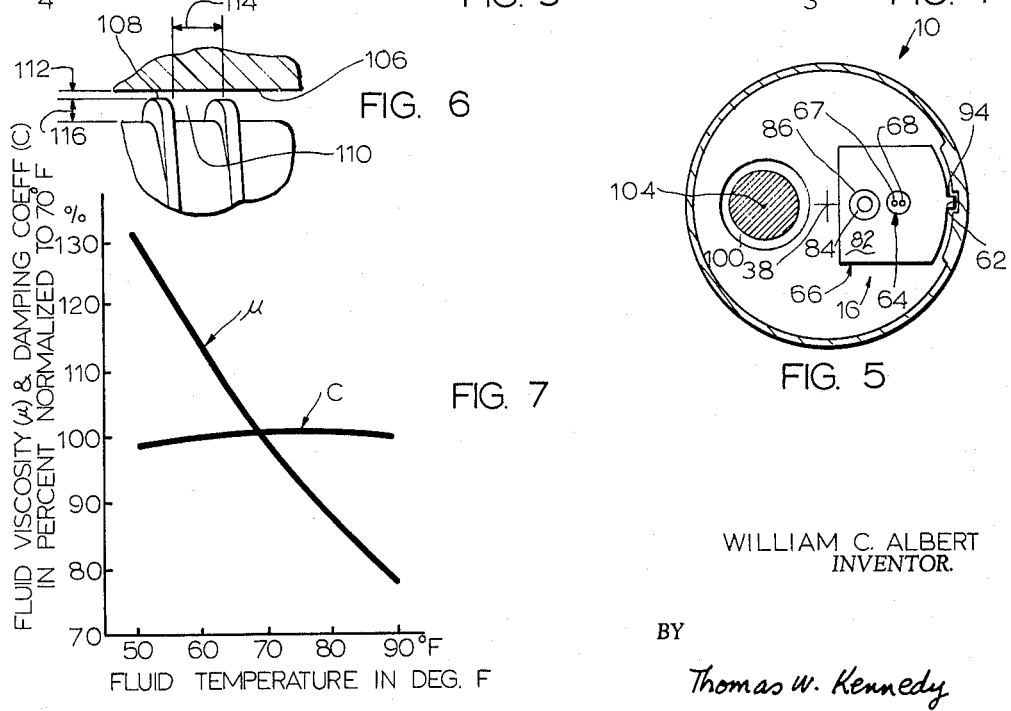
WILLIAM C. ALBERT
INVENTOR.
BY
Thomas W. Kennedy
ATTORNEY United States Patent Office 3,239,620
Patented Mar. 8, 1966

3,239,620
VELOCITY SWITCH
William C. Albert, Waldwick, N.J., assignor to General Precision Inc., Little Falls, N.J., a corporation of Delaware
Filed Nov. 9, 1964, Ser. No. 409,625
1 Claim. (Cl. 200—61.45)

The present invention relates to velocity-responsive means, and particularly to a fluid-damped velocity switch.

A conventional fluid-damped velocity cut-off switch is fully described in U.S. Patent No. 2,960,871, assigned to the same assignee as the present invention.

The prior-art damping device used in the aforementioned velocity switch has a pair of relatively-movable shutter plates disposed in its fluid passage with overlapping apertures forming an adjustable-width passage portion. With such construction, it is sometimes difficult to provide a substantially-constant damping coefficient, or ratio of damping force to flow velocity, with the condition of a wide range of flow velocity for varying instrument acceleration.

In accordance with the present invention, a variable-length passage portion is provided by using an elongate insert disposed within and movable relative to an elongate, narrow passage portion for providing a substantially-constant fluid-damping coefficient over a wide range of fluid viscosity and flow velocity.

Accordingly, it is one object of this invention to provide a fluid-damped instrument with a compact, laminar-flow damping device having a substantially-constant fluid-damping coefficient, or ratio of damping force to flow velocity, over a wide range of fluid viscosity and flow velocity.

It is another object of this invention to provide an inertial-type velocity cut-off switch for use in a variable-thrust flight vehicle which can be set reliably to signal at a terminal velocity within a narrow range of error.

It is a further object of the invention to provide a fluid-damped velocity cut-off switch with a damping device automatically responsive to changes in viscosity, volume, and temperature of the damping fluid.

It is a still further object of the invention to provide an externally-adjustable sealed velocity switch.

To the fulfillment of these and other objects, the invention provides a fluid-damped instrument having an outer body with a cavity containing damping fluid, an inner body disposed in said cavity movable relative thereto forming at least one variable-volume chamber therein, and a damping means connecting to said chamber for flow therethrough from the chamber. The damping means has a tubular means supported by the outer body with a passage connecting to said chamber for flow therethrough and has an elongate bar insert disposed in said tubular passage and movable relative to said tubular passage forming an adjustable-length elongate tunnel between said bar and said tube.

Other objects of the invention will become apparent upon reading the annexed detailed description in connection with the drawings wherein like parts are designated by like numerals throughout the several views, and wherein:

FIG. 1 is a sectional view of a velocity cut-off switch embodying features of the present invention;

FIG. 2 is a sectional view taken on line 2—2 of FIG. 1;

FIG. 3 is a sectional view taken on line 3—3 of FIG. 1;

FIG. 4 is a sectional view taken on line 4—4 of FIG. 3;

FIG. 5 is a sectional view taken on line 5—5 of FIG. 1;

FIG. 6 is an enlarged view of a portion of FIG. 1; and

FIG. 7 is a curve of fluid viscosity and damping coefficient versus fluid temperature.

Referring to FIG. 1, one embodiment of the present invention is a fluid-damped velocity cut-off switch 10, which is also called a hydraulic integrating accelerometer, and an acceleration integrator switch. Velocity switch 10 comprises a housing or outer body 12 having a cavity 14 containing damping fluid (not shown) with a signal switch means 16 fixed at one end thereof and an inner body or proof-mass piston 18 disposed therein and displaceable relative thereto for actuating signal means 16 and for forming two variable-volume chambers 20 and 22, with damping means 24 interconnecting said chambers 20, 22 for flow therebetween and for providing a substantially-constant damping coefficient during changing fluid viscosity and temperature.

Damping means 24 includes a flow regulating means 26 to damp movement of proof-mass 18, a temperature-responsive means 28 for actuating regulator 26, and an adjusting means 30 for calibrating said temperature-responsive means 28.

Velocity switch 10 also has a check-out means 32 disposed at one end of cavity 14 opposite to signal means 16 for verifying that proof mass 18 is at said position prior to operation of velocity switch 10 and to restrain proof mass 18 from displacing due to minor forces. During operation of switch 10, proof mass 18 moves through a travel distance 34 from its initial position as shown in FIG. 1 to a terminal position in which it bears against signal means 16.

Housing 12 (FIG. 1) has a peripheral wall 36 with an axis 38, and a pair of axially-spaced end walls 40, 42. End wall 42 is substantially thicker than end wall 40, and has axially-spaced inner face 44 and outer face 46, respectively facing axially inwardly and axially outwardly therefrom.

Cavity 14 has an enlarged cylindrical cavity portion 48 surrounded by and coaxial with wall 36, and disposed on one side of face 44. Cavity 14 has a proof-mass recess or cylindrical portion 50, which is recessed in end wall 42 and which is disposed on the other side of face 44. Recess 50 has an axis 52 substantially parallel to axis 38. A linear-type ball-bearing unit 54 is press-fitted into recess 50 adjacent to face 44 in which proof mass 18 is journaled to minimize frictional restraint on proof mass 18 during its displacement relative to bearing 54 and to minimize leakage between chambers 20 and 22.

Wall 36 has a tongue-and-groove overlap connection 56 (FIG. 1) with the adjacent portion of end wall 42 for ease of assembly with an O-ring seal 58 to minimize leakage of fluid from housing 12. Wall 36 also has an inner surface 60 with an axially-parallel guide groove 62 (FIG. 5) for cooperation with signal means 16 as explained hereafter.

Signal means 16 has a contact means 64 which closes a circuit to actuate a signal device (not shown) when engaged by proof mass 18, and has a stop means 66 for stopping movement of proof mass 18 on engagement with said contact 64 and also for supporting said contact means 64.

Contact means 64 has a pair of contact pins 67, 68, (FIG. 5), which are radially spaced from and equi-distant from axis 52 and disposed in the path of travel of proof mass 18 for simultaneously engaging proof mass 18 and closing said circuit. Pins 67, 68 have respective terminals 70, 72 mounted in wall 40 with flexible leads 74, 76 respectively connecting terminals 70, 72 to pins 67, 68. Terminals 70, 72 have respective exterior wires 78, 80 connecting to said signal device (not shown).

Stop means 66 has a partition wall 82 (FIG. 5), which supports contacts 67, 68. Wall 82 has a jackscrew 84 for moving wall 82 relative to wall 40 along axis 52 for setting gap 34. Jackscrew 84 is threaded into a coupling sleeve 86 fixedly connected to wall 82, and is journaled in a coaxial ball-bearing unit 88 fixedly connected to wall 40. Jackscrew 84 has a dial 90 at the head thereof, which is disposed on the exterior side of wall 40 for turning jackscrew 84 and for moving wall 82, and also has an O-ring seal 92 to minimize leakage past ball bearing 88. Wall 82 also has a guide tab 94 (FIG. 5) projecting radially therefrom and received in guide groove 62.

According to the invention, damper flow regulator 26 comprises tubular means 96, which is an integral tube-like portion of end wall 42, and which has a passage 98 interconnecting chambers 20 and 22 for laminar-type fluid flow therebetween. Passage 98 has a bar insert 100 which is disposed in one end of said passage 98 for regulating flow therethrough.

Passage 98 has an axial passage portion or recess 102 in end face 44 with a cylindrical elongate shape for receiving bar 100. Recess 102 has an axis 104 disposed substantially parallel to axis 52 and substantially normal to the plane of end face 44. Recess 102 also has an inner surface 106 of constant-diameter cylindrical shape. Passage 98 also has a radial passage portion 107 disposed normal to axis 104 for connecting recesses 50 and 102 forming separate compartments of chamber 22.

Bar 100, which is a cylindrical bar that is coaxial with recess 102 along axis 104, and which is partly covered by inner surface 106 and which is partly projected into chamber 20, and which separates chamber 20 from chamber 22, has a radially outer surface 108 of constant-diameter cylindrical shape (FIG. 6). Outer surface 108 is partly covered by and in sealing engagement with inner surface 106 (FIG. 6), and has a groove 110 (FIG. 6), which extends from one end to the other end of bar 100, and which is covered by the adjacent portion of inner surface 106, forming an elongate tunnel. The covered portion of groove 110 or tunnel has a variable length, said length varying with the movement of bar 100 relative to wall 42, for providing a constant damping coefficient. Outer surface 108 (FIG. 6) is separated from inner surface 106 by a gap 112, which preferably has a size of about a fraction of $\frac{1}{1000}$ of an inch so that outer surface 108 is substantially in sealing engagement with the adjacent portion of inner surface 106. In FIG. 6, the size of gap 112 is greatly exaggerated for purposes of illustration.

Groove 110 (FIG. 6) has a width 114, which is preferably a constant dimension, and has a depth 116, which is preferably a varying dimension, that is, depth 116 is greater adjacent chamber 22 than adjacent chamber 20. In this way, the cross-sectional area of groove 110 is larger adjacent chamber 22 than adjacent chamber 20 for providing a constant damping coefficient for the condition where the tunnel length of covered portion of groove 110 varies linearly with fluid temperature, as further explained hereafter. Groove 110 (FIGS. 1 and 6) also has a helical shape, with its helix preferably having a constant pitch for ease of manufacture. With this construction of helix bar 100, the ratio of bar length to tunnel length is minimized thereby providing a compact unit.

Damper temperature-responsive means 28 includes damping fluid (not shown) in cavity 14 and includes a bellows 118, immersed in said fluid for automatically moving bar 100 in recess 102 with changing fluid volume and temperature.

Bellows 118, which is disposed with clearance inside recess 102 and which is coaxial with helix bar 100 and recess 102 along axis 104, has an axially-inner end 120 fixedly connected to bar 100, and also has an axially-outer end 122 supported by wall 42. Wall 42 also has a portion surrounding one end of recess 102 forming a recess bottom wall 124; and bellows 118 has a stud bolt 126 anchored to and extending through wall 124 for support with a gasket seal 128 between wall 124 and bellows 118 to minimize leakage.

Damper adjusting means 30 includes a volume-adjusting vernier 130 and a high-pressure fluid coupling 132. Vernier 130 has a threaded bore 134 extending from chamber 20 through end wall 42 and a volume-adjusting screw 136 threaded therein and movable relative thereto to set the exact volume of fluid in chambers 20, 22 and passage 98, and to set the exact length of bellows 118 for the calibration of regulator 26. Adjusting screw 136 has an O-ring seal 138 engaging bore 134 to minimize leakage therethrough.

Fluid coupling 132 includes a bore hole or fill port 140 extending from chamber 20 through wall 40 for filling switch 10 with said damping fluid (not shown). Fill port 140 has a diaphragm 142 of elastomeric material, and has a bearing nut 144 to assure sealing engagement of diaphragm 142 and the adjacent portion of port 140. Diaphragm 142 is adapted to permit insertion therethrough of a hypodermic needle (not shown) for removing or adding damping fluid from cavity 14. Adjusting screw 136 is normally tightened down as fluid is pumped out through said needle. Diaphragm 142 is adapted to automatically reseal any opening made by said needle. In this way, velocity switch 10 can be calibrated without breaking its final seals. In addition, velocity switch 10 can be sealed after final assembly, and then tested, and then recalibrated according to said test results.

Check-out means 32, which is supported by end wall 42 adjacent to recess 50, includes a reed switch 146 and a permanent magnet bar 148. Check-out means 32 is adapted to verify that the proof mass 18 is in its initial position (as shown in FIG. 1) prior to a connection to signal means 16 of a signal device (not shown). End wall 42 has a closed-end bore 150 receiving magnet 148 with a plug screw 152 for positioning magnet 148. Bore 150 is recessed in the exterior face of wall 42 coaxial with recess 50, fully separate from and spaced from recess 50, and coaxial with magnet 148. Wall 42 also has a narrower closed-end bore 154 adjacent bore 150 for receiving reed switch 146. Switch 146 is grounded at the bottom of bore 154 and has a connecting supply lead 156 disposed at the exterior of wall 42. Wall 42 also has a ground lead 158 adjacent lead 156 for connecting to a check-out circuit (not shown). With this construction, reed switch 146 is open when proof mass 18 is within its initial position and receiving flux from magnet 148. Magnet 148 has a different flux pattern when proof mass 18 is displaced from its initial position, which closes reed switch 146. In this way, the position of proof mass 18 can be checked as to its position. In addition, magnet 148 acts to restrain displacement of proof mass 18 and counteracts minor vibratory and similar forces urging proof mass 18 away from its initial position. An initial impulse of sufficient magnitude and duration is necessary to release proof mass 18 from its initial or latched position.

The theory for the design of velocity switch 10 is summarized in the formulas presented hereafter.

Piston 18 is subject to a force (F) and a displacement ($h$) which represent the motion to be damped. Force (F) has a direction acting to the left against piston 18 as shown in FIG. 1. At steady state, force (F) is opposed by an equal and opposite damping force.

$$F = VC \qquad (1)$$

where:
V = rate of piston displacement relative to housing 12
C = damping coefficient
F = external force on piston 18.

Piston 18 displaces fluid through the helical flow path at the rate of:

$$Q = VA \qquad (2)$$

where:
Q = rate of fluid flow
A = area of face of piston 18.

The external force (F) causes a pressure drop across piston 18:

$$F = (P_1 - P_2)A \quad (3)$$

where:
  $P_1$=pressure in hi-pressure chamber 20
  $P_2$=pressure in lo-pressure chamber 22.

A damping coefficient equation is obtained by substituting Equations 2 and 3 into Equation 1 and rearranging Equation 1:

$$C = \frac{(P_1 - P_2)A^2}{Q} \quad (4)$$

For laminar flow, the quantity $P_1-P_2/Q$ is governed by the following equation:

$$\frac{P_1 - P_2}{Q} = \frac{KuL}{d^3w} \quad (5)$$

where:
  K=a constant
  u=fluid viscosity
  L=length of covered groove 110
  d=groove depth 116 or smaller cross-section dimension
  w=groove width 114 or larger cross-section dimension.

A final damping coefficient equation is obtained by substituting Equation 5 into Equation 4 and adding A into the constant K:

$$C = KuL/d^3w \quad (6)$$

The fluid viscosity ($u$) lowers with rising fluid temperature, and the fluid volume expands, contracting bellows 118 causing more turns of helical rod 100 to enter recess 102, and increasing tunnel length (L) thereby partly counteracting a change in damping coefficient (C).

A viscosity ($u$) versus temperature curve is non-linear (FIG. 7). A covered-groove length (L) versus temperature curve is straight, where said length (L) varies directly with fluid volume. Thus, the groove depth ($d$) is also varied along said length (L) so that the factor ($uL/d^3$) and the damping coefficient (C) remains substantially constant with changing temperature.

FIG. 7 shows a non-linear curve of viscosity ($u$) versus temperature and a substantially linear and constant curve of damping coefficient (C) versus temperature for comparison of test values of one actual model of embodiment 10 according to the invention.

In operation, velocity switch 10 can be used to indicate a terminal or cut-off velocity in a vehicle, which is propelled into flight by a large initial thrust and accelerated by a continuous, variable thrust. Switch 10, as shown in FIG. 1, would normally be disposed within such a vehicle and would be accelerated in a direction to the right in FIG. 1. Proof mass 18, disposed within switch 10, would normally be accelerated in the same direction to the right in FIG. 1 by the force of the damping fluid within switch 10. For ease of illustration in FIG. 1, housing 12 is shown in a stationary position with proof mass 18 shown acted upon by an acceleration force causing a velocity to the left relative to housing 12. The acceleration force on proof mass 18 equals the constant proof mass times the vehicle acceleration. The acceleration force on proof mass 18 varies with the varying acceleration thrust of the vehicle and causes a proportional flow velocity through groove 110. The flow velocity is proportional to the piston velocity relative to housing 12 in the aforementioned Formula 1. The interval of time for proof mass 18 to reach contacts 67, 68 and to move through travel gap 34 is determined by the level of flow velocity through damper groove 110, a level which varies with the level of vehicle acceleration thrust. Thus, gap 34 is a measure of the total volume of fluid which flows through groove 110, and said volume is a measure of the total velocity reached by the instrument in flight. Groove 110 has a substantially-constant damping coefficient or ratio of damping force to flow velocity because its orifice cross-sectional area does not change substantially, and its orifice length is automatically adjusted to the fluid viscosity.

In summary, velocity switch 10 is an externally-adjustable sealed unit, which can integrate a varying acceleration over a time interval for providing a low-error terminal velocity. Velocity switch 10 has a compact, externally-adjustable, laminar-flow, fluid-damping device furnishing a substantially-constant fluid damping coefficient over a wide range of orifice fluid viscosity and orifice flow velocity.

While the present invention has been described in a preferred embodiment, it will be obvious to those skilled in the art that various modifications can be made therein within the scope of the invention. For example, helix bar groove 110 can have a varying pitch and a constant width and a constant depth; or helix bar groove 110 can have a varying width and a constant pitch and a constant depth; or groove 110 can have other combinations of varying pitch, width and depth. It is intended that the appended claim cover all such modifications.

What is claimed is:

In a damping system wherein motion is damped by enforced displacement of a fluid damping medium through a flow-restricting passage:

means defining a cylindrical bore;

a cylindrical member coaxially disposed in said bore for axial displacement relative thereto, said member having a helical groove in its surface coacting with the bore to define a passage the effective length of which is determined by the relative axial positions of said member and bore, said groove being characterized by physical parameters including its helical pitch and its transverse dimensions, at least one of said parameters varying monotonically along the passage; and the variation of said parameters and the degree of said relative displacement being such as to maintain substantially constant the value of the expression:

$$KuL/d^3w$$

wherein:
  K=a constant
  $u$=viscosity of the damping medium
  $d$=the depth of said groove
  $w$=the width of said groove
  L=effective length of said groove.

References Cited by the Examiner

UNITED STATES PATENTS

| | | | |
|---|---|---|---|
| 993,831 | 5/1911 | Junggren | 138—43 |
| 2,960,871 | 11/1960 | Ganther et al. | 73—497 |
| 3,011,036 | 11/1961 | La Rocca | 200—87 |

BERNARD A. GILHEANY, *Primary Examiner.*

J. J. BAKER, *Assistant Examiner.*